US005793306A

United States Patent [19]
Vershinin et al.

[11] Patent Number: 5,793,306
[45] Date of Patent: Aug. 11, 1998

[54] IDENTIFICATION SYSTEMS EMPLOYING FREQUENCY-BASED CODED INFORMATION

[76] Inventors: Michael Vershinin, 2080 Wallace Ave., No. 622, Bronx; Elina Tsyvkina, 178 Bay 23rd St., Apt. 18, Brooklyn, both of N.Y. 10462

[21] Appl. No.: 581,349

[22] Filed: Dec. 29, 1995

[51] Int. Cl.⁶ .................. A08C 19/00; B60L 1/00; B60R 25/04
[52] U.S. Cl. ............... 340/825.69; 340/825.69; 340/825.73; 307/10.1; 307/10.3; 307/10.5
[58] Field of Search ............ 340/825.69, 825.73, 340/825.72, 825.22, 825.07, 825.54, 825.83, 426; 307/10.1, 10.22, 10.3, 10.5, 10.6, 10.7

[56] References Cited

U.S. PATENT DOCUMENTS

| | | | |
|---|---|---|---|
| 3,987,408 | 10/1976 | Sassover et al. | 340/64 |
| 4,023,138 | 5/1977 | Ballin | 340/64 |
| 4,107,543 | 8/1978 | Kaplan | 307/10 AT |
| 4,159,467 | 6/1979 | Ballin | 340/64 |
| 4,292,541 | 9/1981 | Ambrosius | 307/10 AT |
| 4,614,909 | 9/1986 | Järvfält | 328/140 |
| 4,672,375 | 6/1987 | Mochida et al. | 340/825.31 |
| 4,691,801 | 9/1987 | Mann et al. | 180/287 |
| 4,719,460 | 1/1988 | Takeuchi et al. | 340/825.31 |
| 4,733,638 | 3/1988 | Anderson | 123/198 B |
| 4,738,334 | 4/1988 | Weishaupt | 180/287 |
| 4,811,013 | 3/1989 | Akutsu | 340/825.31 |
| 4,835,407 | 5/1989 | Kataoka et al. | 307/10.5 |
| 4,835,533 | 5/1989 | Akutsu | 340/825.31 |
| 4,897,644 | 1/1990 | Hirano | 340/825.31 |
| 4,910,493 | 3/1990 | Chambers et al. | 340/426 |
| 4,987,406 | 1/1991 | Reid | 340/539 |
| 5,132,551 | 7/1992 | Carlo et al. | 307/10.3 |
| 5,172,094 | 12/1992 | Stadler | 340/426 |
| 5,191,610 | 3/1993 | Hill et al. | 380/21 |
| 5,224,567 | 7/1993 | Tomlinson | 180/287 |
| 5,276,728 | 1/1994 | Pagliaroli et al. | 379/58 |
| 5,280,267 | 1/1994 | Reggiani | 340/426 |
| 5,287,006 | 2/1994 | Carlo et al. | 307/10.3 |
| 5,303,259 | 4/1994 | Loveall | 375/202 |
| 5,307,048 | 4/1994 | Sonders | 340/426 |
| 5,343,077 | 8/1994 | Yoshida et al. | 307/9.1 |
| 5,420,568 | 5/1995 | Iida et al. | 340/542 |
| 5,463,372 | 10/1995 | Mawyer, Sr. | 340/428 |
| 5,654,688 | 8/1997 | Allen et al. | 340/426 |

OTHER PUBLICATIONS

F.R.Dungan, "Electronic Communications Systems", 1987, Breton Publishers, Boston, MA pp. 274, 275, 277, 278.
W.D.Gregg, "Analog and Digital Communication", 1977, John Wiley & Sons pp. 342–348.
M.Schwartz, "Information Transmission, Modulation, and Noise", 3rd ed., 1980, McGraw–Hill pp. 32–53.
D.G.Fink & D.Christiansen, "Electronics Engineers' Handbook", 3rd ed., 1989, McGraw–Hill pp. 14–48.

Primary Examiner—Michael Horabik
Assistant Examiner—Anthony A. Asongwed
Attorney, Agent, or Firm—Darby & Darby

[57] ABSTRACT

An identification or protection system for vehicles, doors, lights and other electronic objects possessing a disabled state, having a disabling circuit operatively associated with the identification system so that when said resulting circuit is activated, the object achieves its disabled state; a transmitter transmitting a signal for a period of time at least once during a succession of time intervals using frequency-based coding; a receiver configured to receive the signal transmitted by the transmitter, the receiver causing the disabling circuit to disable the object when the receiver does not receive a number of consecutive signals from said transmitter which exceeds a pre-determined threshold.

21 Claims, 3 Drawing Sheets

IDENTIFICATION SYSTEMS EMPLOYING FREQUENCY-BASED CODED INFORMATION

FIELD OF THE INVENTION

The present invention relates to the field of electronic identification systems that use a matched transmitter and receiver to analyze frequency-based coded data. More particularly, the present invention relates to identification systems that protect objects from their unauthorized use as well as theft.

BACKGROUND OF THE INVENTION

The ultimate objective of any anti-theft system is to prevent unauthorized use as well as theft of the object being protected. Due to the high value associated with most motor vehicles, and the relative ease with which a thief can realize the value of a stolen motor vehicle, many manufacturers have designed anti-theft systems to work specifically with cars. It should be appreciated, however, that the subject invention is not so limited. By way of background, many of the issues associated with security for automobiles are equally applicable to other devices as well. The subject invention, while described with respect to automobiles at least as an embodiment, can be equally applied without deviation from the spirit of the invention, as a high-security key (to open doors without physical action taken, i.e., by eliminating the need for regular keys and swipe-through cards like smart cards, chip cards, and magnetic cards), as a personal identifier (replacing regular ID's for local needs, such as ID's for corporate personnel, college students, library patrons) by denying access to safes, computer databases and other high-security objects, as a security monitor device (by monitoring the presence of certain staff members on selected premises, or searching for people in extreme conditions, e.g., mountain climbers after an avalanche or other catastrophic event, military personnel in war conditions, fugitives, parolees, etc.), and as an automatic control device (to, e.g., switch electrical appliances or lights on when a person enters a room and switch them off after the person leaves).

Turning to automobiles specifically, the most common way in which cars are stolen is through a break-in and "hot-wire." Typically, a thief will gain access to a car either by breaking a car window or breaking a door lock. Once inside the car, the thief may use various techniques to start the car without the use of an ignition key. One such technique involves either breaking the ignition lock cylinder or the entire steering column and using a screwdriver or other such tool to turn the ignition switch. Regardless of which method is preferred by a thief, the underlying principle is to start the car without a key and drive it away.

To combat car theft, manufacturers of security systems have developed various techniques intended to make the task of starting a car without a key more difficult, but rarely impossible. Car anti-theft alarm systems are broken down into two basic categories, passive and active, where each alarm system today fits into either one or both of these categories. A passive alarm system simply disables the car from starting and moving on its own power. Usually, the anti-theft system has a relay placed in series with one of the car's more important electrical systems, such as the circuit powering the car's fuel injections system. When the anti-theft system triggers, the relay is opened, disabling the car from using its fuel and moving on its own power. An active anti-theft system will sound an audible alarm in response to an unauthorized action (e.g., breaking of the car window or door lock). Many currently available systems fit into both categories and will disable the car as well as sound an alarm.

Such anti-theft systems basically have two states of operation, armed and disarmed. The system is set into its armed state when the car is left unattended and the operator no longer intends on using the car. When armed, the system waits either to be triggered or disarmed. The anti-theft system is usually triggered in response to some unauthorized act such as a break-in or forced motion of the car. Once triggered, the system will respond in one of the ways described earlier, depending upon whether it is a passive or active system.

When the rightful operator of the car so chooses, he or she disarms the anti-theft system, thereby allowing access to the car. Typically, once disarmed, the anti-theft system lies dormant, not responding to any event other than a signal to re-arm. Many systems re-arm automatically some period after the operator removes the ignition key and locks the car, while others only re-arm in response to an express signal from the operator to re-arm.

Currently available car anti-theft systems use time-based coding schemes in order to insure that the rightful car operator is arming and disarming the system. Some systems use a numeric keypad with which the operator enters a preset code, thus identifying him or herself as a rightful operator and disarming the anti-theft system. Other systems use a matched radio transmitter and receiver configuration for the purposes of signaling the anti-theft system to arm or disarm. The receiver is integrated into the anti-theft system installed in the car, while the transmitter is carried by the rightful operator. When proximate to the car, the operator presses a button on the transmitter, causing a coded signal to be transmitted to the receiver which, in turn, disarms the anti-theft system. Conversely, when the operator is leaving the vehicle, he/she causes the transmitter to transmit a coded signal to the receiver, causing the anti-theft system to re-arm.

The above mentioned anti-theft systems are partially effective in situations where the thief attempts to steal the car while it is parked, and neither the rightful operator nor the transmitter is at hand. As long as the thief cannot disarm the anti-theft system, it is unlikely that he or she will be able to drive the car away. However, the prior art is inadequate to address situations where the thief either forcibly obtainers the transmitter or forces the rightful operator to disarm the anti-theft system. Since the transmitter is necessary to actually start the car, it becomes obvious to the thief that a transmitter exists when the car cannot be immediately started.

Although there are numerous patents in the prior art which address the problem of theft of a parked vehicle, few address the problem of hijacking (also know as "carjacking"). In theft by carjacking, the owner is accosted by an armed thief while approaching the parked vehicle or while preparing to drive off, and is forced to surrender the vehicle. Being in a state of panic the owner is in no position to take any protective action for his or her vehicle, the only thought in mind being to surrender the vehicle without suffering physical harm. In these instances, typically the anti-theft system has already been disarmed, or, should the thief seek to start the car, the car does not start, thereby indicating the presence and need of the transmitter device. The thief knows in these instances of the presence of an anti-theft device, and can force the rightful operator to disarm it. The prior art systems are generally useless in

3 guarding against these situations, and the thief can drive off with the car as though he were the rightful operator. At best, the system may re-arm when the car is ultimately shut-off. At that point, however, the car will probably be in a "chop shop," being prepared for disassembly, or will have the anti-theft system removed.

U.S. Pat. No. 5,172,094, issued Dec. 15, 1992 to David M. Stadler addressed the problem of carjacking in disclosing a passive protection system, wherein opening of a vehicle door or an attempt to start the vehicle motor initiates a predetermined time cycle. If a reset signal is not received before the end of the time cycle, a vehicle disabling circuit is set which is activated by pressing the brake pedal. The drawback of this design is that failure to reset the system will cause an interruption for the lawful operator.

U.S. Pat. No. 4,107,543, issued Aug. 15, 1978 to Neil B. Kaplan, also shows a passive vehicle anti-theft system utilizing a combination of condition responsive switching components which are automatically armed as the authorized user leaves the vehicle and closes the last vehicle door.

The following U.S. Patents are directed to user-activated code-matching systems wherein a button is pushed, or the user must be within the range of action of the monitoring system: U.S. Pat. No. 3,987,408; 4,292,541; 4,672,375; 4,691,801; 4,719,460; 4,733,638; 4,738,334; 4,811013; ,835,407; 4,835,533; 4,897,644; 5,132,551; 5,224,567; 5,276,728; 5,280,267; 5,287,006; 5,307,048; 5,343,077; 5,420,568. In general, these patents disclose systems that are designed to provide keyless entry to a vehicle, but do not work as anti-car-jacking devices. Moreover, as discussed below, these patents do not show the use of frequency-based coding in identification systems.

Certain other U.S. Patents show systems that are always alert, and not used just for entry to the vehicle: U.S. Pat. No. 4,023,138; 4,159,467; 4,910,493; 4,987,406. Of major distinction, these patents do not show the use of frequency-based coding for identification systems.

Time-based coding, while shown in the prior art, is limiting, power-intensive, and simple to decode. Time-based coding is based upon a series of pulses (of time duration $\tau$) issued periodically (over a period T) by a transmitter. The pulses in series have duration $\tau$ and follow each other at predetermined intervals which constitute the code. The pulses are produced using impulse modulation of frequency $f_o$ (see, e.g., U.S. Pat. No. 4,159,467). The power spectrum resembles the square of a Fourier transform of a pulse.

Thus, in time-based coding, the power of the transmitter is "spread" over $2/\tau$ band of frequencies. To maximize power per frequency, it is clearly beneficial to increase $\tau$ to thereby drive the bandwidth down. This, however, decreases the amount of information transmittable per period T, and thus creates the ability to create a simple decoding procedure.

Frequency-based coding, which is implemented by the subject invention as is described in greater detail below, overcomes the limitations of time-based coding. Frequency-based coding provides for the transmission of information through the presence or absence of certain frequencies (it is still possible to transmit a limited amount of information at each of those frequencies). By having a basic set of N frequencies and a code of specified K of those frequencies present, the ability is thereby provided to transmit N!/K!(N-K)! bits of information.

None of the prior art shows a system which remains armed at all times and remains constantly vigilant for, and responsive to, the unauthorized operation of the vehicle through the implementation of frequency-based coding.

4

SUMMARY OF THE INVENTION

The present invention overcomes and avoids the problems of arming and disarming encountered by the prior art, especially when dealing with carjacking situations. The system constantly monitors for the presence of a rightful operator in the vehicle, and disables the vehicle some short time after the system has determined that the rightful operator is not present in the car. The system is designed with the understanding that, when faced with a carjacking situation, it is in the best interests of the victim to let the carjacker drive off with the vehicle, avoiding possible physical harm. It is also in the best interest of the vehicle owner to have the vehicle disabled after the thief has traveled sufficiently far to no longer represent a threat to the victim.

The present invention is directed to a car anti-theft/anti-carjacking system which remains armed at all times. The system comprises a transmitter, a receiver, and a disabling circuit connected with receiver. Both the receiver and the disabling circuit are installed into a car to be protected. The disabling circuit is connected into a critical electrical system of the car, e.g., a system without whose proper operation the car cannot be driven (i.e. ignition, fuel injection, distributor, etc.) as are well shown in the art. The receiver, also in the car, is connected to the disabling circuit by a channel which allows the receiver to cause the disabling circuit to trigger and disable the vehicle. The transmitter, which is either carried or worn by the rightful operator of the car, transmits a signal of a finite duration at regular intervals using frequency-based coding. The receiver is constantly on, and tuned to receive the signal transmitted by the transmitter. If the receiver fails to receive signals from the transmitter at regular intervals, the system deems that a rightful operator is not present either in or around the vehicle.

By employing frequency-based coding, battery power for the remote transmitter is conserved. Following the formulas set forth above, by increasing $\tau$, it is possible to dissipate all the power at k frequencies (with extremely narrow bandwidth at each frequency), thus saving energy. Mathematically, this looks as follows:

The energy needed for time-based coding per period T is at least: $E_t=(2/\tau)P_{min}T$, where $P_{min}$ is the minimum power needed per frequency to render the signal distinguishable from noise.

In comparison, the energy needed for frequency-based coding per period T (if we increase $\tau$ to be equal to t) is at least: $E_f=K(2/\tau)P_{min}T$, where K is the number of frequencies selected.

Now $E_f/E_t=(K\tau)/t$, and since $\tau<t$, therefore for wide range of K, it follows that $E_f<E_t$. This is clearly so even using K=2 for large N it is thus possible to transmit N(N-1)/2 bits of information. Additionally, the invention is not limited to K=2.

Simplifying, instead of actually transmitting information, the invention determines which information out of N!/K! (N-K)! possibilities is encoded. Since frequency-coding is used, the information is very hard to intercept so that the code is better protected than in time-based coding systems of the prior art. Clearly, by increasing N, it is possible to gain the ability to increase the number of possible combinations, without any increase in energy spent by the battery-powered transmitter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention is further described in detail below with reference to the accompanying drawing, in which.

DETAILED DESCRIPTION OF THE PREFERRED EMBODIMENTS

As best shown in

Figure 1:
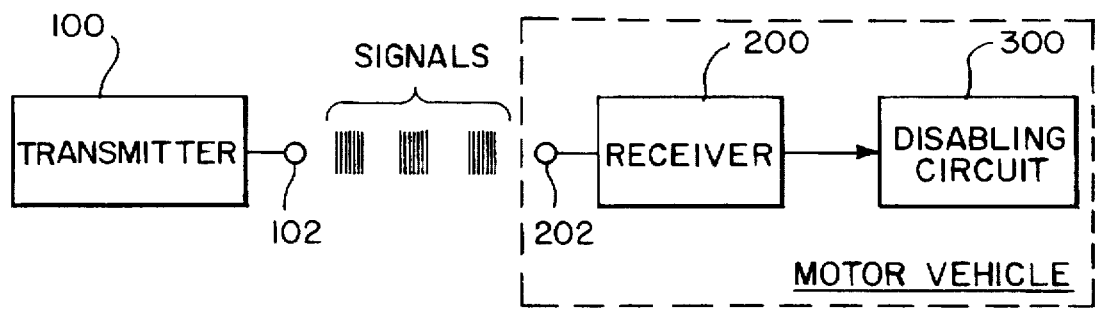
FIG. 1 is a block diagram of the system in accordance with the invention.
Figure 4:
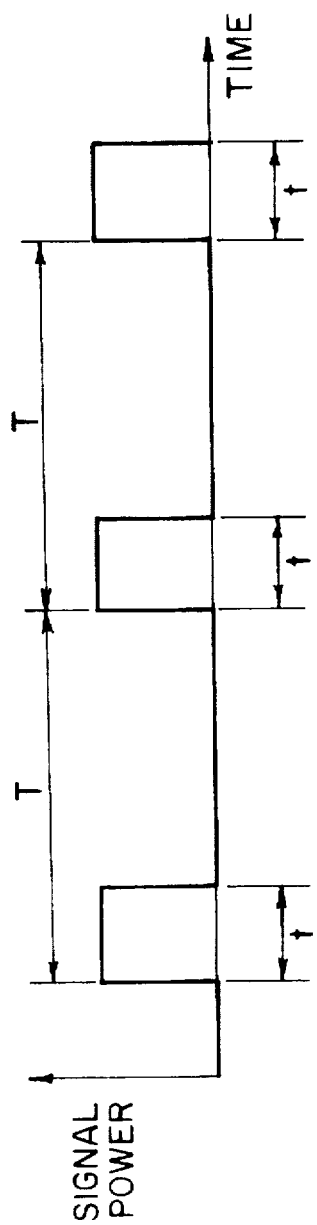
FIG. 4 is a representation of the signal generated by the transmitter.

FIG. 1, the preferred embodiment according to the present invention includes a transmitter 100, a receiver 200, and a disabling circuit 300. As best shown in FIG. 4, the transmitter 100 generates and transmits through an antenna 102 a low power RF signal of finite duration t every interval T. It should be understood that T and pulse duration (t or $\tau$) can assume any values that one of ordinary skill in the art can impart without deviating from the scope of the invention. The values set forth herein are examples only, and are not to be construed as limiting the scope of the invention.

The receiver 200 is tuned to receive the signal, and continuously monitors for the signal's presence using its antenna 202. When the receiver 200 fails to receive a predetermined number of consecutive signals from the transmitter 100, it triggers the disabling circuit 300. Once triggered, the disabling circuit 300 disables some critical system within the car, thereby disabling the car itself. The application of such a disabling circuit is well-known to those of skill in the art.

Figure 2:
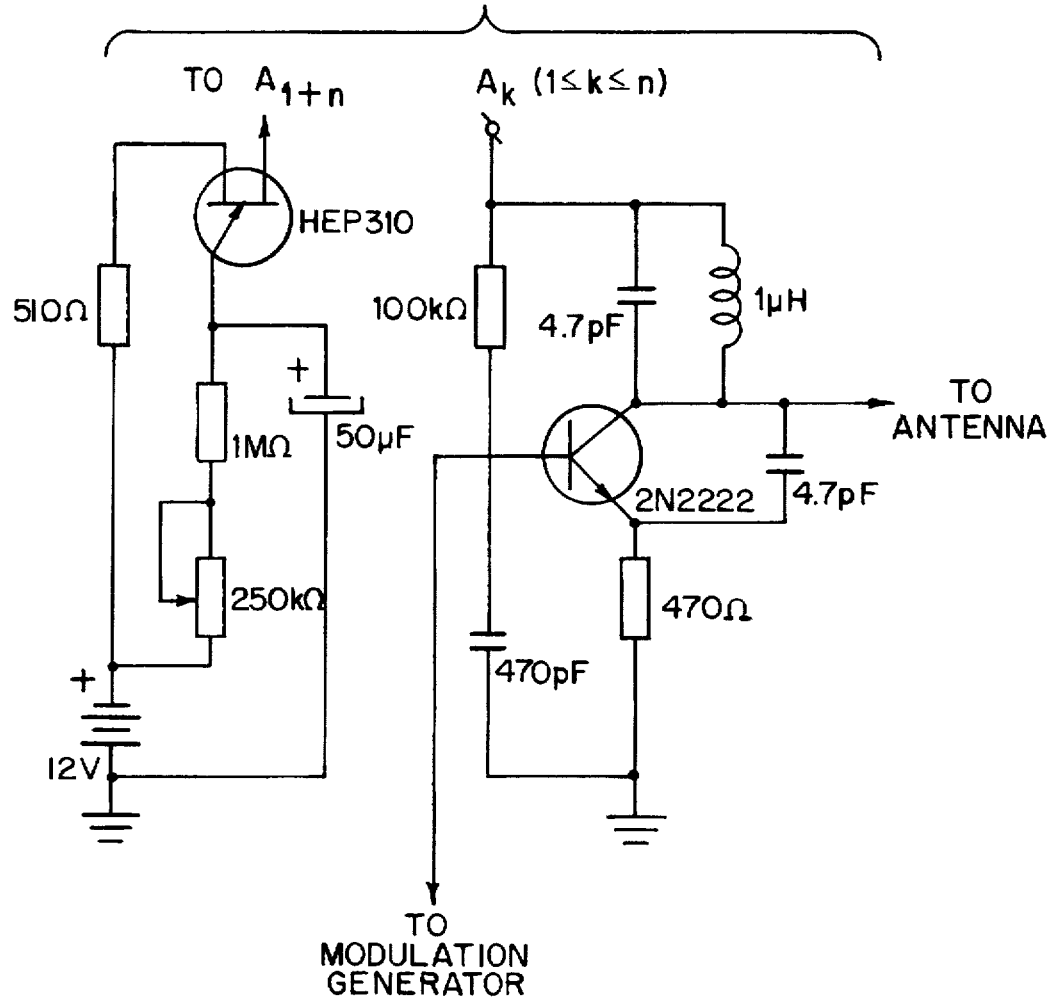
FIG. 2 is a schematic of the preferred embodiment of the transmitter.

FIG. 2 is a schematic diagram of the preferred embodiment of the transmitter 100, showing various components in accordance with a preferred embodiment of the invention. The transmitter 100 may be structured as four functional blocks which are better understood by reference to FIG. 3. The transmitter 100 comprises a battery 104 powering a metronome 106 and a signal generator 108. The signal generated by the signal generator 108 is radiated out through the antenna 102. The signal generator 108 generates a signal only when triggered by a pulse from the metronome 106. The metronome 106 is user-adjustable and can be calibrated to assume any value. In the preferred embodiment, the metronome 106 is calibrated to pulse once every 60 seconds (i.e., T=60 seconds). The pulse duration is likewise user-adjustable, but preferably about 0.1 seconds.

Figure 3:
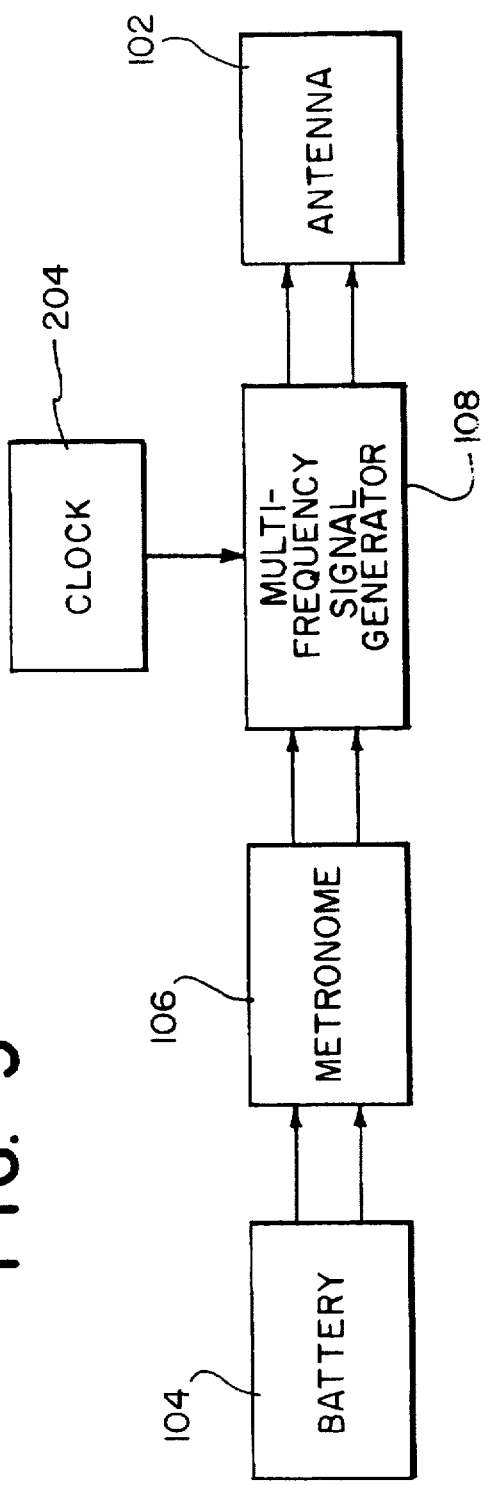
FIG. 3 is block diagram of the transmitter.

It should be appreciated that transmitter 100, in accordance with the invention, is battery operated (via battery 104, as shown in FIG. 3) in order to render it portable, and concealable. The preferred embodiment of the transmitter circuit (see FIG. 2) has been configured to minimize power use. The current embodiment can run for a year from a 12 Volt DC batter cell with capacitance of 0.035 (A-h). There are a wide range of battery cells with the above parameters, e.g., Duracell's MN21B alkaline cell. In calculation, the metronome 106 has an output voltage of 9 V. Let $R_{gen}$ be the resistance of the generator. Then, $R_{gen} \geq 470\Omega$. Therefore, the following is true about the current I through the generator: $I \leq 9/470 = 0.019$A. So that: $Power_{generator} < 0.019*9 = 0.18$W. A slight correction must be made to account for the role of the antenna radiating the ac components. Estimating the role of ac components by RMS value: $Power_{RMS} \leq Power_{dc}/4\sqrt{2}$, so that $Power_{total} \leq 0.21$W.

Continuing, every sixty (60) seconds, in the current embodiment, the device issues a non-zero signal which lasts for approximately 0.01 sec. Since the total power dissipated in the HF generator is below 0.21W, as stated above, the energy spent during one signal is below 0.0021J. Since one year=525,960 minutes, the total energy spent in one year is as follows: $E_{total} < 0.0021*525960 = 1104.5$ J$=0.31$ (W-hours).

The capacity of a 9 volt battery should be thus:

CAP=0.31/9=0/035 (A-h).

The power dissipated by the metronome is on the order of ~1mW, i.e., negligible. However, the battery cell has to be 12 V in order for the metronome's output voltage to be 9 V.

The signal transmitted by the transmitter may contain data content which is used by the receiver to authenticate the source of the signal. Additionally, the transmitter may transmit differently modulated signals at different frequencies, the combination and sequence of which is known only to the receiver, thus making emulation of the transmitter's signals that much more difficult. As an even further security step, the data content on each frequency may be shuffled according to some pseudo-random sequence, also only know by the receiver, making signal emulation almost impossible. The signal from the transmitter is preferably a composite of several component signals of different frequencies. In the preferred embodiment, the component signals each have a pattern, such as encoded data, or other recognizable feature, which allows the receiver to verify that signals received are actually from the transmitter, and not from background noise, or from a counterfeit transmitter carried by a would-be thief.

With respect to FIG. 2, preferred electronic element manufacturers are as follows:

1. Semiconductors: HEP-310; 2N2222
   Manufacturer: Motorola Semiconductors Production, Inc.
   9800 Richmond Avenue
   Houston, Tex. 77042-4527
   1-713-783-6400
2. Electrolytic capacitor
   Manufacturer:Panasonic, Japan
   Manufacturer in the USA of a product with the same specifications:
   Philips ECG
   Brentwood, Calif. 94513
   1-510-634-9878
3. Potentiometer:
   Manufacturer: Bourns, Inc.
   45 Stiles Road
   Salem, N.H. 03079-4808
   1-603-893-6670
4. Resistors and Capacitors:
   Manufacturer: NTE Electronics, Inc.
   44 Farrand Street
   Bloomfield, N.J. 07003-2516
   1-201-748-5089
5. Switch:
   Manufacturer: C & K Technologies 1033 Business Center Cir.
Newbury Park, Calif. 91320-1141
1-805-498-6787

6. Coil was chosen from the inductor coils set by Radio Shack (Catalog Number 273-1601).

Figure 5:
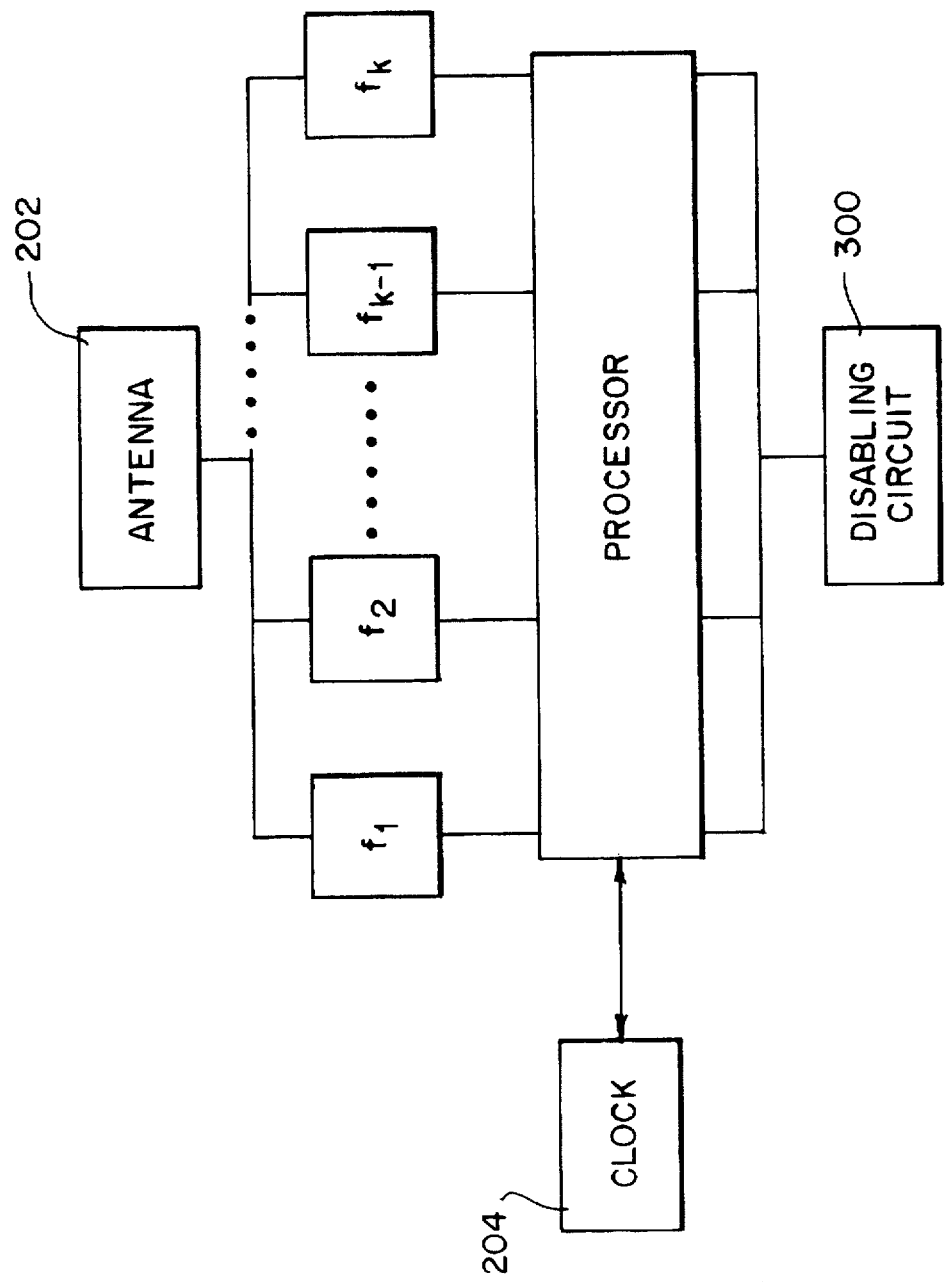
FIG. 5 is a block diagram of a preferred embodiment of the receiver.

FIG. 5 shows a block diagram of a preferred embodiment of the receiver 200, coupled into the disabling circuit 300. The receiver 200 has an antenna 202 for receiving the signal from the transmitter 100. When the signal is received, the data content for the several frequencies (f1, f2, f3 ... $f_k$) are separated by filters 203 and each signal is read and compared by processor circuit 205 to what the receiver knows should be the data content on each frequency. If the data of each of the component signals matches, the signal is authenticated as being from the proper transmitter 100.

To enhance the reliability of the system, the patterns of each of the component signals may be varied from interval to interval. To accomplish this, a clock 204 pulses and causes the expected frequency - data combination to shift in a pseudo-random pattern. A similar clock in the transmitter 100 adjusts the patterns sent by transmitter 100. If several consecutive signals are missed or not authenticated as coming from the transmitter 100, the receiver 200 signals the disabling circuit 300 to disable the car.

If an attempt is made to start the vehicle while it is parked, the anti-theft system waits to receive a signal from transmitter, which the rightful operator would have in his or her possession. If the signal is received, the system triggers the disabling circuit to stop disabling the vehicle, otherwise, the vehicle remains disabled.

If the signal is received, the system enables the operation of the vehicle as described above and takes no further action other than to wait for the next signal due to be transmitted within another interval. The interval being anywhere from several seconds to several minutes. If, at any time during the operation of the vehicle the receiver fails to receive and identify several consecutive signals from the transmitter, the system deems that the person operating the vehicle is not the rightful operator, and triggers the disabling circuit to disable the vehicle. Depending upon what period is set as the time interval between consecutive signals, and what number of missed signals the receiver will tolerate before triggering the disabling circuit, the system will disable the vehicle anywhere from several seconds to several minutes after the car has been started.

In a situation such as a carjacking, where the rightful operator of the vehicle is forcibly ejected from the vehicle, the transmitter which is on his or her person will also be ejected from the vehicle. As the car drives away and the distance between the transmitter and receiver increase, the receiver will stop receiving the periodic signals from the transmitter. As in the situation where the car is started from a parked position, if the receiver fails to receive some number of consecutive signals, it will deem that the rightful operator of the vehicle is not in the car and will trigger the disabling circuit. This allows for the carjacker to drive far enough so as not to remain a threat to the victim, but not far enough to succeed in his criminal endeavor.

This same transmitter/receiver configuration may be used for a variety of purposes other than just automobile protection. For example, the transmitter can be used as a key for security doors. The receiver which can be connected to the locking circuit of a door, and would cause such locking circuit to open the door when the receiver receives a signal from the transmitter carried by a person approaching the door. The same configuration can be connected to a lighting, temperature control, or even attendance monitoring system.

Each transmitter carried by a person can be used to uniquely identify that person. Receivers, connected to various devices can cause each device to respond in some specific way to either the presence or absence of an individual carrying a transmitter. Numerous possibilities exist for the application of a system for a person carrying an identifying transmitter to interact with devices equipped with receivers.

Additionally, the invention also possesses unique military applications. For example, the invention can be utilized to disarm weapons and other devices if captured by an opponent, or if intended to be used for applications other than those sought by the owner of the equipment, or the provider of the device. For example, the protected object may be partially disabled for a set period of time, after which a disabling circuit stops all functioning of the object relating to a predetermined use thereof, such as the firing of a weapon. Likewise, the invention can be employed to create "one-sided" explosive devices that only destroy objects that lack proper identification.

It should be understood that the preferred embodiments and examples described are for illustrative purposes only and are not to be construed as limiting the scope of the present invention which is properly delineated only in the appended claims.

What is claimed:

1. An identification system for an object having a disabled state, said identification system comprising:
    a disabling circuit operatively associated with the identification system so that when said disabling circuit reaches a pre-determined state, the object achieves its disabled state;
    a transmitter transmitting a set of signals simultaneously over a plurality of frequencies for a period of time at least once during a succession of time intervals using frequency-based coding; and
    a receiver configured to receive the set of signals over the plurality of frequencies simultaneously transmitted by said transmitter, said receiver causing the disabling circuit to disable the object when said receiver does not receive at least a pre-determined number of consecutive signals over a plurality of frequencies from said transmitter.

2. The identification system of claim 1, wherein said object is selected from the group consisting of doors, safes, vehicles, utilities, computers, lights, and any other equipment which requires exclusive and/or regulated use and any part thereof.

3. The identification system according to claim 1, wherein said time interval, and said number of consecutive signals constituting a threshold for disabling said object, are changeable by an operator of said identification system.

4. An identification system according to claim 1, wherein the transmitter transmits the set of signals with a recognizable signal pattern, and the receiver corroborates the receipt of the set of signals from the transmitter by analyzing the signal pattern in the set of signals.

5. An identification system according to claim 1, wherein the transmitter transmits the set of signals on a plurality of frequencies using a different modulation technique for each frequency.

6. An identification system according to claim 5, wherein the receiver receives each of the set of signals on each of the frequencies, the receiver corroborating the transmission of the set of signals from the transmitter on each of the frequencies.

7. An identification system according to claim 1, wherein the set of signals with the pluralities of frequencies each have a distinct signal pattern.

8. A protective system for preventing theft of an object having a disabled state, said protective system comprising:

a disabling circuit operatively associated with an electrical system of the object so that when said disabling circuit reaches a pre-determined state, the object is electronically disabled;

a transmitter transmitting a set of signals simultaneously over a plurality of frequencies for a period of time at least once during a succession of time intervals using frequency-based coding; and a receiver connected with said disabling circuit and configured to receive the set of signals over the plurality of frequencies simultaneously transmitted by said transmitter, said receiver causing the disabling circuit to disable the object when said receiver does not receive at least a pre-determined number of consecutive signals over a plurality of frequencies from said transmitter.

9. A protective system according to claim 8, wherein said transmitter transmits the set of signals with a recognizable signal pattern, and said receiver corroborates the receipt of the set of signals from the transmitter by analyzing said signal pattern in the set of signals.

10. A protective system according to claim 8, wherein said transmitter transmits said set of signals on a plurality of frequencies using a different modulation technique for each frequency.

11. A protective system according to claim 10, wherein said receiver receives each of said set of signals on each of said frequencies, said receiver corroborates the transmission of the set of signals from the transmitter on each of said frequencies.

12. A protective system according to claim 11, wherein for every time interval said transmitter changes the signal pattern of said set of signals by changing at least some of said frequencies, and wherein said receiver alters its processing of signals received to correspond to the changes in the signal patterns of the transmitter.

13. The protective system according to claim 12, wherein said receiver and transmitter changes signals according to a pseudo-random pattern.

14. A protective system according to claim 8, wherein signals on said pluralities of frequencies each have a distinct signal pattern.

15. The protective system according to claim 8, wherein said disabling circuit partially disables the object.

16. The protective system according to claim 15, wherein said disabling circuit partially disables the protected object for a set period of time, after which said disabling circuit stops all functioning of the object relating to a predetermined use thereof.

17. The protective system of claim 8, wherein said object is selected from the group consisting of doors, safes, vehicles, utilities, computers, lights, and any other equipment which requires exclusive and/or regulated use and any part thereof.

18. The protective system according to claim 8, wherein said time interval, and said number of consecutive signals constituting a threshold for disabling said object, are changeable by an operator of said protective system.

19. A system for providing security for an object having a disabled state, the system comprising:

a disabling circuit operatively connected to the object for causing the object to achieve the disabled state;

a transmitter having a multi-frequency signal generator for simultaneously transmitting a plurality of signals each being modulated at a plurality of different frequencies in a frequency-based coding scheme; and a receiver having a plurality of filters with outputs, with each filter separating a respective one of the plurality of signals simultaneously transmitted from the transmitter according to the frequency-based coding scheme, wherein the receiver causes the disabling circuit to disable the object when the receiver does not receive at least a pre-determined number of consecutive signals from the transmitter at the output of each filter corresponding to the frequency-based coding scheme.

20. The system of claim 19, wherein the receiver, responsive to a match between the plurality of signals transmitted from the transmitter and a pre-determined set of data corresponding to authenticity, disables the disabling circuit to allow operation of the object.

21. The system of claim 19, wherein the object is a motor vehicle which operates using energy from an energy source connected thereto, and which is in a disabled state when the energy from the energy source is discontinued;

wherein the disabling circuit is operatively connected to the energy source for causing the motor vehicle to achieve the disabled state by the discontinuation of the energy from the energy source to the motor vehicle; and wherein the receiver causes the disabling circuit to disable the motor vehicle by discontinuation of energy thereto when the receiver does not receive at least a pre-determined number of consecutive signals from the transmitter at the output of each filter corresponding to the frequency-based coding scheme, to provide security in the use of the motor vehicle.

* * * * *